US010773709B2

(12) United States Patent
West et al.

(10) Patent No.: US 10,773,709 B2
(45) Date of Patent: Sep. 15, 2020

(54) SYSTEM AND METHOD FOR ENERGY RATE BALANCING IN HYBRID AUTOMATIC TRANSMISSIONS (71) Applicant: Allison Transmission, Inc., Indianapolis, IN (US)

(72) Inventors: Stephen T. West, New Palestine, IN (US); Jeffrey K. Runde, Fishers, IN (US); John P. Kresse, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 229 days.

(21) Appl. No.: 16/042,008

(22) Filed: Jul. 23, 2018

(65) Prior Publication Data
US 2018/0334159 A1    Nov. 22, 2018

Related U.S. Application Data (60) Continuation of application No. 15/420,123, filed on Jan. 31, 2017, now Pat. No. 10,029,672, which is a (Continued)

(51) Int. Cl.
*B60W 20/16* (2016.01)
*B60W 10/115* (2012.01)
(Continued)

(52) U.S. Cl.
CPC ............ *B60W 20/16* (2016.01); *B60K 6/48* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 10/10; B60W 30/188;
(Continued)

(56) References Cited

U.S. PATENT DOCUMENTS 6,276,449 B1    8/2001    Newman
6,393,350 B1    5/2002    Light et al.
(Continued)

FOREIGN PATENT DOCUMENTS

CN       1654854 A     8/2005
CN     101474968 A     7/2009
(Continued)

OTHER PUBLICATIONS

International Search Report and Written OPinion issued in PCT/US2014/020499, dated Jun. 16, 2014, 17 pgs.
(Continued)

*Primary Examiner* — Aaron L Troost
(74) *Attorney, Agent, or Firm* — Woodard Emhardt Henry Reeves & Wagner LLP (57) ABSTRACT A hybrid system includes a transmission control module, a power source, a transmission, and a drive train. The transmission control module partially operates the hybrid system and receives operating information from various components of the system, calculates power losses in the drive train, and calculates the driving torque needed to reach a target power profile determined from a driver's input.

22 Claims, 4 Drawing Sheets

Related U.S. Application Data division of application No. 14/794,928, filed on Jul. 9, 2015, now Pat. No. 9,592,822, which is a continuation of application No. PCT/US2014/020499, filed on Mar. 5, 2014.

(60) Provisional application No. 61/786,669, filed on Mar. 15, 2013.

(51) Int. Cl.

| | | |
|---|---|---|
| *B60W 30/188* | (2012.01) | |
| *B60W 20/30* | (2016.01) | |
| *B60W 10/06* | (2006.01) | |
| *B60W 10/08* | (2006.01) | |
| *B60W 20/10* | (2016.01) | |
| *B60W 10/10* | (2012.01) | |
| *B60W 50/08* | (2020.01) | |
| *B60K 6/48* | (2007.10) | |
| *B60W 50/00* | (2006.01) | |

(52) U.S. Cl.
CPC .......... *B60W 10/10* (2013.01); *B60W 10/115* (2013.01); *B60W 20/10* (2013.01); *B60W 20/30* (2013.01); *B60W 30/188* (2013.01); *B60W 50/082* (2013.01); *B60K 2006/4825* (2013.01); *B60W 2050/0041* (2013.01); *B60W 2510/0241* (2013.01); *B60W 2510/0275* (2013.01); *B60W 2510/0283* (2013.01); *B60W 2510/0666* (2013.01); *B60W 2510/085* (2013.01); *B60W 2510/104* (2013.01); *B60W 2510/1005* (2013.01); *B60W 2510/106* (2013.01); *B60W 2510/107* (2013.01); *B60W 2510/108* (2013.01); *B60W 2510/1045* (2013.01); *B60W 2510/1075* (2013.01); *B60W 2510/1085* (2013.01); *B60W 2510/1095* (2013.01); *B60W 2510/244* (2013.01); *B60W 2510/305* (2013.01); *B60W 2540/10* (2013.01); *B60W 2540/12* (2013.01); *B60W 2540/215* (2020.02); *B60W 2710/0677* (2013.01); *B60W 2710/086* (2013.01); *B60W 2710/1061* (2013.01); *B60Y 2200/92* (2013.01); *B60Y 2300/188* (2013.01); *Y02T 10/6252* (2013.01); *Y02T 10/6286* (2013.01); *Y10S 903/93* (2013.01)

(58) Field of Classification Search
CPC . B60W 2510/0241; B60W 2510/0275; B60W 2510/0283; B60W 2510/0666; B60W 2510/085; B60W 2510/1005; B60W 2510/106; B60W 2510/107; B60W 2510/1085; B60W 2510/1095; B60W 2710/0677; B60W 2710/086; B60W 2710/1061; B50K 6/48; B60K 2006/4825; B60Y 2200/92; B60Y 2300/188; Y10S 903/93

See application file for complete search history.

(56) References Cited

U.S. PATENT DOCUMENTS

| | | | |
|---|---|---|---|
| 6,434,466 B1 | 8/2002 | Robichaux et al. | |
| 6,441,588 B1 | 8/2002 | Yagi et al. | |
| 6,469,403 B2 | 10/2002 | Omata et al. | |
| 6,518,732 B2 | 2/2003 | Palanisamy | |
| 6,686,724 B2 | 2/2004 | Coates et al. | |
| 6,727,676 B2 | 4/2004 | Ochiai | |
| 6,799,650 B2 | 10/2004 | Komiyama et al. | |
| 6,904,342 B2 | 6/2005 | Hanada et al. | |
| 7,009,401 B2 | 3/2006 | Kinoshita et al. | |
| 7,015,676 B2 | 3/2006 | Kohama et al. | |
| 7,021,409 B2 | 4/2006 | Tamor | |
| 7,076,356 B2 | 7/2006 | Hubbard et al. | |
| 7,078,877 B2 | 7/2006 | Salasoo et al. | |
| 7,131,708 B2 | 11/2006 | Tao et al. | |
| 7,295,902 B2 | 11/2007 | Chen et al. | |
| 7,305,873 B2 | 12/2007 | Hubbard et al. | |
| 7,407,026 B2 | 8/2008 | Tamor | |
| 7,449,891 B2 | 11/2008 | Cawthorne | |
| 7,479,761 B2 | 1/2009 | Okumura | |
| 7,482,767 B2 | 1/2009 | Tether | |
| 7,486,036 B2 | 2/2009 | Oyobe et al. | |
| 7,521,935 B2 | 4/2009 | Uchida | |
| 7,532,961 B2 | 5/2009 | Hoshiba et al. | |
| 7,538,520 B2 | 5/2009 | Zettel et al. | |
| 7,550,946 B2 | 6/2009 | Zettel et al. | |
| 7,639,018 B2 | 12/2009 | Zettel et al. | |
| 7,645,209 B2 | 1/2010 | Dreibholz et al. | |
| 7,657,350 B2 | 2/2010 | Moran | |
| 7,661,370 B2 | 2/2010 | Pike et al. | |
| 7,677,341 B2 | 3/2010 | Tomo | |
| 7,719,238 B2 | 5/2010 | Iida et al. | |
| 7,730,984 B2 | 6/2010 | Heap et al. | |
| 7,768,235 B2 | 8/2010 | Tae et al. | |
| 7,770,676 B2 | 8/2010 | Tenbrock et al. | |
| 7,770,678 B2 | 8/2010 | Nozaki et al. | |
| 7,784,575 B2 | 8/2010 | Yamanaka et al. | |
| 7,795,844 B2 | 9/2010 | Ichikawa et al. | |
| 7,800,345 B2 | 9/2010 | Yun et al. | |
| 7,828,693 B2 | 11/2010 | Soliman et al. | |
| 7,836,985 B2 | 11/2010 | Itoh | |
| 7,863,789 B2 | 1/2011 | Zepp et al. | |
| 7,865,287 B2 | 1/2011 | Huseman | |
| 7,878,282 B2 | 2/2011 | Kumazaki et al. | |
| 7,893,637 B2 | 2/2011 | Suhama et al. | |
| 7,908,064 B2 | 3/2011 | Cawthorne et al. | |
| 7,923,950 B2 | 4/2011 | Takahashi | |
| 7,928,699 B2 | 4/2011 | Kohn | |
| 7,935,015 B2 | 5/2011 | Tabata et al. | |
| 7,967,091 B2 | 6/2011 | Yamazaki et al. | |
| 7,971,669 B2 | 7/2011 | Gieray et al. | |
| 7,977,896 B2 | 7/2011 | Heap et al. | |
| 7,987,934 B2 | 8/2011 | Huseman | |
| 7,998,023 B2 | 8/2011 | Holmes et al. | |
| 8,000,866 B2 | 8/2011 | Heap et al. | |
| 8,002,667 B2 | 8/2011 | Hsieh et al. | |
| 8,010,247 B2 | 8/2011 | Heap et al. | |
| 8,020,652 B2 | 9/2011 | Bryan et al. | |
| 8,022,674 B2 | 9/2011 | Miura | |
| 8,029,408 B2 | 10/2011 | Seel | |
| 8,030,883 B2 | 10/2011 | Katayama | |
| 8,035,324 B2 | 10/2011 | Heap | |
| 8,035,349 B2 | 10/2011 | Lubawy | |
| 8,047,959 B2 | 11/2011 | Fuechtner et al. | |
| 8,053,921 B2 | 11/2011 | Ichikawa | |
| 8,063,609 B2 | 11/2011 | Salasoo et al. | |
| 8,078,417 B2 | 12/2011 | Ishishita | |
| 8,082,743 B2 | 12/2011 | Hermann et al. | |
| 8,091,667 B2 | 1/2012 | Zettel et al. | |
| 8,098,050 B2 | 1/2012 | Takahashi | |
| 2003/0173934 A1 | 9/2003 | Arimitsu | |
| 2005/0080537 A1 | 4/2005 | Cawthorne et al. | |
| 2005/0182526 A1* | 8/2005 | Hubbard | B60K 6/445 701/1 |
| 2007/0090803 A1 | 4/2007 | Yun et al. | |
| 2008/0224478 A1 | 9/2008 | Tamor | |
| 2009/0027060 A1 | 2/2009 | Carlhammar et al. | |
| 2009/0118929 A1 | 5/2009 | Heap et al. | |
| 2009/0118941 A1 | 5/2009 | Heap | |
| 2009/0118964 A1 | 5/2009 | Snyder et al. | |
| 2009/0118971 A1 | 5/2009 | Heap et al. | |
| 2009/0204280 A1 | 8/2009 | Simon, Jr. et al. | |
| 2009/0308674 A1 | 12/2009 | Bhattarai et al. | |
| 2010/0116235 A1 | 5/2010 | Imamura et al. | |
| 2010/0125019 A1 | 5/2010 | Tabata et al. | |
| 2010/0250037 A1 | 9/2010 | Yoshida et al. | |
| 2010/0262308 A1 | 10/2010 | Anderson et al. | |
| 2010/0262323 A1 | 10/2010 | Tanba et al. | |

(56) References Cited

U.S. PATENT DOCUMENTS

| | | |
|---|---|---|
| 2010/0263952 A1 | 10/2010 | Richter et al. |
| 2010/0299036 A1 | 11/2010 | Vespasien |
| 2010/0312422 A1 | 12/2010 | Imaseki |
| 2011/0040433 A1 | 2/2011 | Steuernagel |
| 2011/0048823 A1 | 3/2011 | Connelly et al. |
| 2011/0130904 A1 | 6/2011 | McGrogan et al. |
| 2011/0301791 A1 | 12/2011 | Swales et al. |
| 2011/0320075 A1 | 12/2011 | Kim et al. |
| 2011/0320077 A1 | 12/2011 | Choi |
| 2012/0059542 A1 | 3/2012 | Kawai et al. |

FOREIGN PATENT DOCUMENTS

| | | |
|---|---|---|
| CN | 101633355 A | 1/2010 |
| CN | 102019926 A | 4/2011 |
| EP | 2 055 583 A2 | 5/2009 |
| JP | 2010-241394 A | 10/2010 |
| WO | WO 2012/114430 A1 | 8/2012 |

OTHER PUBLICATIONS https://web.archive.org/web/20121021073022/http://www.epi-eng.com/piston_engine_technology/power_, (Year: 2012)—Power and Torque: Understanding the Relationship Between the Two, by EPI Inc.—pp. 1-8.

\* cited by examiner

SYSTEM AND METHOD FOR ENERGY RATE BALANCING IN HYBRID AUTOMATIC TRANSMISSIONS

CROSS REFERENCE TO RELATED APPLICATIONS

This application is a continuation application of U.S. application Ser. No. 15/420,123, filed Jan. 31, 2017, which is a divisional of U.S. application Ser. No. 14/794,928 filed Jul. 9, 2015, which is a continuation of International Application No. PCT/US2014/020499 filed Mar. 5, 2014, which claims the benefit of U.S. Provisional Application No. 61/786,669 filed Mar. 15, 2013, which are hereby incorporated by reference in their entirety.

BACKGROUND

The present disclosure generally relates to a hybrid vehicle drive train and, more particularly, to a method of adjusting the torque output of the drive train to match a target power profile.

Over the past few years, there has been a growing concern over global climate change due to an increase in carbon dioxide levels as well as oil supply shortages. As a result, automobile manufactures and consumers are developing a greater interest in motor vehicles having lower emissions and increased fuel efficiency. One viable option is a hybrid electric vehicle which allows the vehicle to be driven by electric motors, combustion engine, or a combination thereof.

Transmissions in hybrid drive trains serve a number of functions by transmitting and manipulating torque in order to provide torque to an output member. The driver, through actuation of the accelerator, brake pedal, and auxiliary braking selectors, commands the engine and/or electric motor to provide a desired power to the vehicle drive train. The transmission is expected to accurately implement the driver's command. As the transmission changes the gear ratio, the driver's intent is not always achieved. Gear shifts within transmissions often result in disturbances in the drive train power output profile. The disturbances manifest as vibrations in the vehicle which are felt by the driver and passengers. Such disturbances can cause discomfort to the driver and passengers or otherwise create an undesirable driving experience.

Hybrid vehicle drive trains provide additional options for tailoring power output profiles based on a user's particular needs. For example, the power profile can be tailored to provide many different functions such as optimizing fuel economy, maximizing acceleration, reducing or eliminating vibrations from gear shifts, or otherwise smoothing the drive train power profile for driver and passenger comfort. However, problems exist with transforming a drive train power input to a desired drive train power.

Thus, there is a need for improvement in this field.

SUMMARY

The hybrid system described herein addresses several of the issues mentioned above as well as others. In one example, a method for operating a hybrid vehicle including a drive train having a transmission and a power source includes the actions of receiving a command input from a driver, determining a current state of the vehicle, determining loss parameters of the drive train, establishing a target drive train output power profile as a function of the command input, establishing power loss within the drive train as a function of the loss parameters, establishing a requisite input power needed to reach the target drive train output power profile as a function of the loss parameters and the target drive train output power profile, and supplying the requisite input power to the drive train. The loss parameters can include hydraulic power loss, kinetic power loss, and clutch power loss.

The hydraulic power loss can be calculated as a function of hydraulic loss parameters within the transmission. The hydraulic loss parameters can include the temperature of a hydraulic fluid, the pressure of the hydraulic fluid, and the flow rate of the hydraulic fluid.

The kinetic power loss can be calculated as a function of rotational inertia loss parameters within the drive train. The rotational inertia loss parameters include the rotational inertia of at least one body within the transmission, the rotational speed of the body, and the rotational acceleration of the body. The kinetic power loss ($P_K$) is calculated by the formula $$P_K = \sum_{1}^{N} J_{i_{1-N}} \omega_{i_{1-N}} \dot{\omega}_{i_{1-N}}$$

for i=1–N bodies, where J is the rotational inertia of the body, $\omega$ is the rate of rotation of the body, and $\dot{\omega}$ is the rotational acceleration of the body.

The clutch power loss is calculated as a function of clutch loss parameters within the transmission. The clutch loss parameters include torque transmitted across the clutch during engagement between two clutch plates, and the rotational speed of each clutch plate. The clutch power loss ($P_{clutch}$) is calculated by the formula $$P_{clutch} = \sum_{1}^{K} T_{clutch_{m_{1-K}}} |\omega_1 - \omega_2|_{m_{1-K}}$$

for m=1–K bodies, where $T_{clutch}$ is torque transmitted across the clutch during engagement between two clutch plates and $|\omega_1-\omega_2|$ is the absolute value of the difference between the rates of rotation of each clutch plate.

The power source can include an engine in the hybrid module. The requisite input power can be described as $P_{engine}+P_{hybrid}$ and is calculated by the formula $$P_{dt} = P_{engine} + P_{hybrid} - P_{loss} - \sum_{1}^{N} J_{i_{1-N}} \omega_{i_{1-N}} \dot{\omega}_{i_{1-N}} - \sum_{1}^{K} T_{clutch_{m_{1-K}}} |\omega_1 - \omega_2|_{m_{1-K}},$$

where $P_{dt}$ is the target drive train output power profile, J is the rotational inertia of i=1–N bodies in the transmission, $\omega$ is the rate of rotation of i=1–N bodies in the transmission, $\dot{\omega}$ this the rotational acceleration of i=1–N bodies in the transmission, $T_{clutch}$ is the torque transmitted across m=1–K clutches during engagement between two clutch plates, and $|\omega_1-\omega_2|$ is the magnitude of the difference between the rates of rotation of two clutch plates in m=1–K clutches. The calculations can be performed by a transmission/hybrid control module.

In one example, a method for operating a hybrid vehicle having a drive train including a transmission and a power source includes the actions of establishing a target drive train output power profile, establishing hydraulic power loss of the drive train as a function of hydraulic loss parameters within the transmission, establishing kinetic power loss of the drive train as a function of rotational inertia loss parameters within the drive train, establishing clutch power loss of the drive train as a function of clutch loss parameters within the transmission, establishing the drive train input power needed to reach the drive train output power profile as a function of the hydraulic loss parameters, the rotational inertia loss parameters, and the clutch loss parameters, and adjusting torque supplied by the power source to reach the target drive train output power profile.

The hydraulic loss parameters can include the temperature of a hydraulic fluid, the pressure of the hydraulic fluid, and the flow rate of the hydraulic fluid. The rotational inertia loss parameters can include the rotational inertia of a body within the transmission, the rotational speed of the body, and the rotational acceleration of the body. The kinetic power loss ($P_K$) can be calculated by the formula $$P_K = \sum_i^N J_{i_{1-N}} \omega_{i_{1-N}} \dot{\omega}_{i_{1-N}}$$

for i=1-N bodies, where J is the rotational inertia of the body, $\omega$ is the rate of rotation of the body, and $\dot{\omega}$ is the rotational acceleration of the body.

The clutch loss parameters can include torque transmitted across the clutch during engagement between two clutch plates, and the rotational speed of each clutch plate. The clutch power loss ($P_{clutch}$) can be calculated by the formula $$P_{clutch} = \sum_1^K T_{clutch_{m_{1-K}}} |\omega_1 - \omega_2|_{m_{1-K}}$$

for m=1-K bodies, where $T_{clutch}$ is the torque transmitted across the clutch during engagement between two clutch plates and $|\omega_1 - \omega_2|$ is the absolute value of the difference between the rates of rotation of each clutch plate.

The power source can include an engine and the hybrid module. The torque supplied by the power source can be characterized as $P_{engine} + P_{hybrid}$ and is calculated by the formula $$P_{dt} = P_{engine} + P_{hybrid} - P_{loss} - \sum_1^N J_{i_{1-N}} \omega_{i_{1-N}} \dot{\omega}_{i_{1-N}} - \sum_1^K T_{clutch_{m_{1-K}}} |\omega_1 - \omega_2|_{m_{1-K}},$$

where $P_{dt}$ is the target drive train output power profile, J is the rotational inertia of i=1-N bodies in the transmission, $\omega$ is the rate of rotation of i=1-N bodies in the transmission, $\dot{\omega}$ this the rotational acceleration of i=1-N bodies in the transmission, $T_{clutch}$, is torque transmitted across m=1-K clutches during engagement between two clutch plates, and $|\omega_1 - \omega_2|$ is the magnitude of the difference between the rates of rotation of two clutch plates in m=1-K clutches.

The disclosure further includes an apparatus for performing any of the actions described herein. Further forms, objects, features, aspects, benefits, advantages, and embodiments of the present disclosure will become apparent from a detailed description and drawings provided herewith.

DESCRIPTION OF THE SELECTED EMBODIMENTS

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 1:
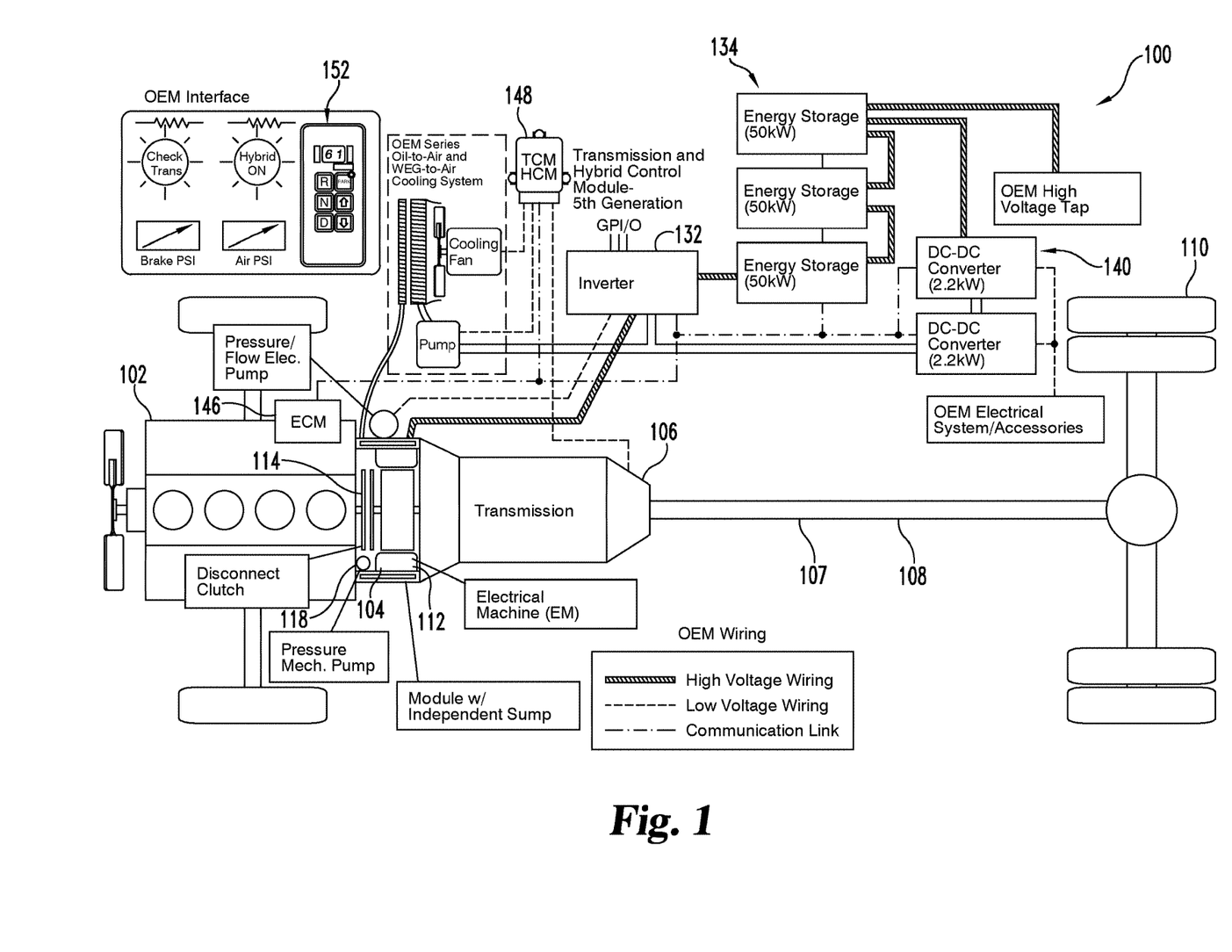
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes a drive train 108 having a transmission 106, power sources in the form of an engine 102 and hybrid module 104, and a drive shaft 107. The drive train 108 is positioned to transfer power between the power sources and wheels 110. The hybrid module 104 incorporates an electrical machine, commonly referred to as an eMachine 112, and a clutch that operatively connects and disconnects the engine 102 from the eMachine 112 and the transmission 106. An energy storage system 134 is operatively coupled to an inverter 132 and the eMachine 112.

The transmission 106 is an automatic transmission that is capable of automatically changing gear ratios as the vehicle moves. The transmission 106 has variable gear ratios which can be selected or changed in an automatic fashion during operation. The transmission 106 can be a variety of types, but commonly is a hydraulic transmission including one or more planetary gearsets and a plurality of clutches. The planetary gearset(s) is a compound epicyclic gearset having one or more outer gears revolving about a central gear. The gearset(s) typically includes bands and clutches actuated by hydraulic servos. A hydraulic fluid (such as a lubricating or automatic transmission fluid) provides lubrication, corrosion prevention, and a hydraulic medium to convey mechanical power for operation of the transmission. In some embodiments, the transmission 106 includes a torque converter for hydraulically connecting the power sources to the transmission 106. The transmission 106 can include a pump which draws the hydraulic fluid from a sump and circulates the fluid throughout the transmission 106 and/or pressurizes it for input to a torque converter housing. Transmission 106 can include a fluid cooling system for maintaining the temperature of the hydraulic fluid. The cooling system can be shared with other components of the hybrid system 100 or it can be a dedicated to the transmission 106. In some embodiments, the transmission 106 is fluidly connected with the hybrid module 104. The transmission 106 includes an input shaft which is coupled to the hybrid module 104 and an output shaft which is coupled to the drive shaft 107.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module 148 substitutes for a traditional transmission control module and is designed to control both the operation of the transmission 106 as well as the hybrid module 104. The transmission/hybrid control module 148 and the engine control module 146 along with the inverter 132, energy storage system 134, and a DC-DC converter system 140 communicate along a communication link as is depicted in FIG. 1. In a typical embodiment, the transmission/hybrid control module 148 and engine control module 146 each comprise a computer having a processor, memory, and input/output connections. Additionally, other vehicle subsystems may also contain computers having similar processors, memory, and input/output connections. During operation, the transmission/hybrid control module 148 receives information from various components of the vehicle, determines the appropriate gear ratio and implements changes, or shifts between gear ratios upon acceleration or braking demands from the driver. The system includes a shift selector 152 for selecting whether the vehicle is in drive, neutral, reverse, etc.

Figure 2:
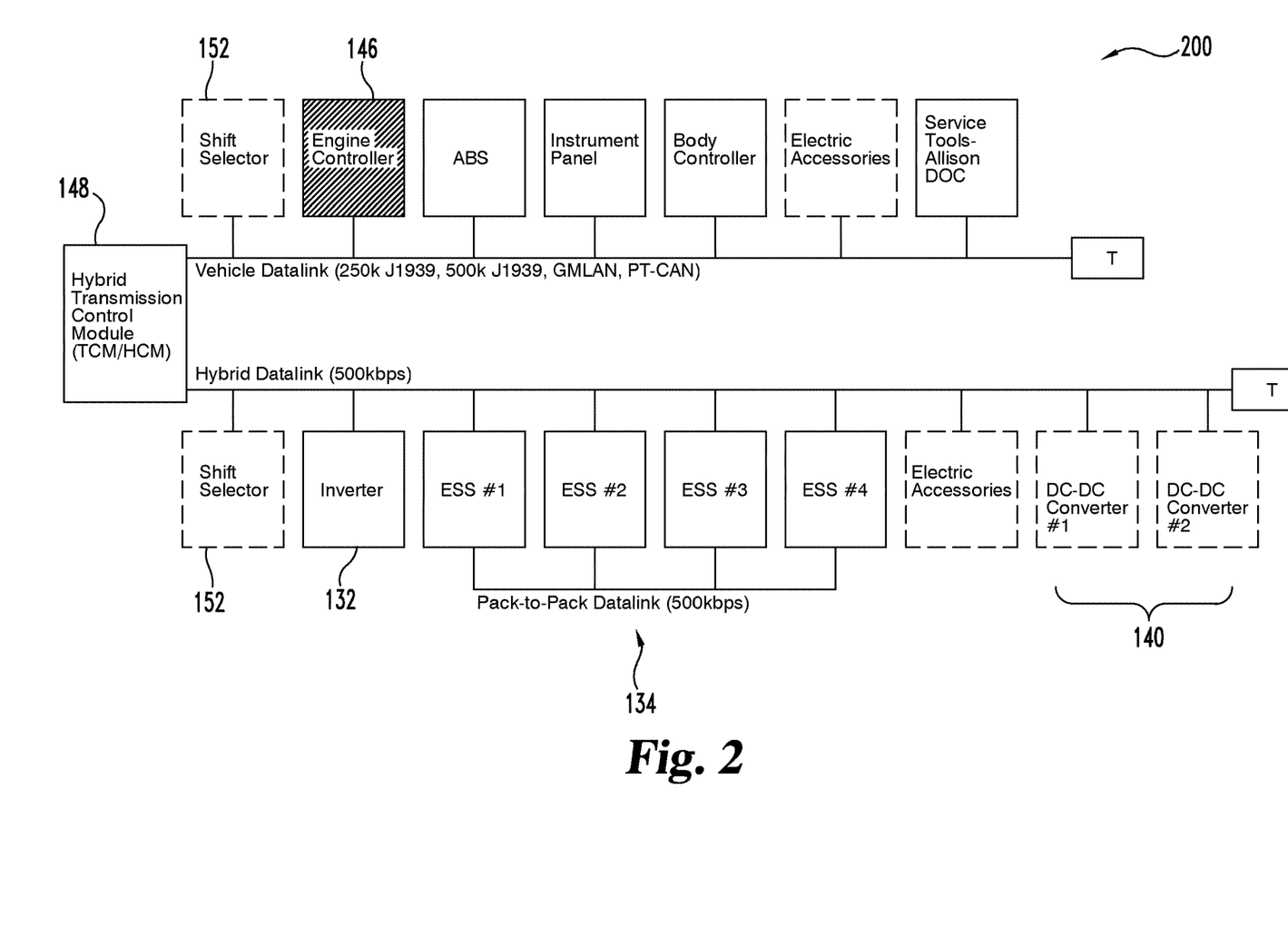
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than what is shown. The hybrid/transmission control module 148 includes a hybrid data link and a vehicle data link through which most of the various components of the hybrid system 100 communicate. In particular, the data links facilitate communication between the transmission/hybrid control module 148, the engine control module 146, the energy storage system 134, the inverter 132, the shift selector 152, and the DC-DC converter system 140 as well as other components.

Various information is exchanged or communicated between the transmission/hybrid control module 148 and other various components. In terms of general functionality, the transmission/hybrid control module 148 receives power limits, capacity available current, voltage, temperature, state of charge, status, and fan speed information from the energy storage system 134 and the various energy storage modules within. The transmission/hybrid control module 148 in turn sends commands for connecting the various energy storage modules so as to supply voltage to and from the inverter 132. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed. From the inverter 132, the transmission/hybrid control module 148 also receives a high voltage bus power and consumption information. The transmission/hybrid control module 148 also communicates with and receives information from the engine control module 146 and in response controls the torque and speed of the engine 102 via the engine control module 146.

The various components of the hybrid system 100 as well as their function are discussed in further detail in U.S. patent application Ser. No. 13/527,953, filed Jun. 20, 2012 and International Application No. PCT/US2011/041018, filed Sep. 9, 2011, published as WO 2012/034031 A2, which are hereby incorporated by reference.

Disclosed herein is a method of controlling the drive train power profile. As used herein "power profile" refers to the torque profile delivered to wheels 110 over a given period of time. A target drive train output power profile (target power profile) is tailored to produce a specific power profile in response to a command from the driver. Driver commands can include actuating the accelerator, releasing the accelerator, actuating the brake pedal, releasing the brake pedal, engaging auxiliary braking selectors, or any combination, degree, or variance of the same. The method generally includes setting a target power profile in response to a driver command, determining the cumulative power losses of the drive train, and adjusting the power input from the power sources so that the actual power delivered to wheels 110 (i.e. actual power profile) matches the target power profile. The target power profile is monitored continuously or during set intervals over time and adjusted based on new or different driver commands. Various operating parameters of the drive train 108 are likewise monitored continuously or during set intervals in order to calculate the power losses and actual power delivered to wheels 110 at any given moment. Power losses are generally defined as energy losses over a period of time. Power losses are commonly dependent on a several loss parameters at any given moment and change with variance in the loss parameters. Power losses do not necessarily occur linearly, and various relationships between energy loss and time are described below.

During operation, various operating parameters of the drive train 108 are known, monitored, and/or calculated by the transmission/hybrid control module 148 and used when determining the amount of torque that is necessary to achieve the target power profile. Operating parameters are divided herein into the vehicle data and loss parameters. Loss parameters include hydraulic power loss, kinetic power loss, and clutch power loss. Vehicle data includes in part the rotational speed of the engine 102 output shaft, the rotational speed of the hybrid module 104, and the speed and acceleration of the vehicle (including the rotational speed of the drive shaft 107. Examples of loss parameters include the gear configuration of the transmission 106, the rotational speeds of each part of the transmission 106 (i.e. various groupings of gears), the temperature and pressure of the hydraulic fluid in the transmission, and the state of engagement of all of the clutches in transmission 106. The sampled values are transmitted to or obtained by the transmission/hybrid control module 148.

More specifically, several losses occur in the transmission 106 hydraulic system. Certain parameters of the transmission 106 hydraulic system are known (i.e. hydraulic loss parameters). A sensor positioned along the fluid flow path of the hydraulic fluid monitors and reports the temperature of the hydraulic fluid. Similarly, a sensor monitors and reports the pressure of the hydraulic fluid. The flow rate of the hydraulic fluid is also monitored and reported. Energy losses occur due to fluid friction from moving parts and moving fluid as well as losses from oil pressure changes. Efficiency of the hydraulic system varies with variances in the temperature of the fluid. Energy dissipated (and therefore lost) within the transmission 106 due to the transmission hydraulic system have been determined through testing and are generally well known for any given values of these loss parameters. Such losses for any given values of these loss parameters are denoted herein as equation (1):

$$P_{loss} = \text{transmission hydraulic system losses} \quad (1)$$

Other loss parameters include the rotational rates and acceleration of all rotating parts in the drive train 108. Generally, energy losses occur when rotating parts maintain, change, or reverse rotational speeds. The kinetic energy of a rotating body is described mathematically as $$E = \frac{1}{2}J\omega^2,$$

where J is the rotational inertia of the body, and w is the angular velocity of the body. The rotational inertia (or polar moment of inertia) is the property of the body that measures its resistance to rotational acceleration about an axis, i.e. the degree of outside force necessary to reduce the rotation rate of the body. The rotational inertia of various parts of the transmission 106 for every possible gear and clutch configuration has been determined through testing and are well known. Generally, for each configuration one or more groups of components rotate in unison (not including transitory periods of clutch engagement and disengagement), and the rotational inertia of each group is determined. Power is defined as the time rate of change of energy, so the power of a rotating body can be found by taking the time derivative of E. Therefore the power is $$P = \frac{dE}{dt} = J\omega\dot{\omega}$$

where $\dot{\omega}$ is the time derivative of $$\omega \left( \text{i.e. } \frac{d\omega}{dt} \right),$$

or the rotational acceleration of the body. Practically, the rotational acceleration can be determined from or quantified as the surplus of power versus the load, or in the case of the drive train, the rotational acceleration is dependent on the power available and the weight of the vehicle and can be determined accordingly. The rotational speed of bodies in the drive train are known through sensors and/or known relationships between input values and various gear configurations. Thus, the total power loss due to kinetic energy dissipation (kinetic power loss) can be expressed and calculated according to equation (2):

$$P_K = \sum_i^N J_{i_{1-N}} \omega_{i_{1-N}} \dot{\omega}_{i_{1-N}} \quad (2)$$

for N groups of components rotating in unison (i.e. i=1–N), where J, ω, and $\dot{\omega}$ are known values for any given set of loss parameters.

Other loss parameters are related to engagement of the clutches in the transmission 106. A clutch is a mechanical device for controlling the connection between two rotating bodies. Clutches generally include two metal plates that are pressed together by hydraulic force. When pressed together, frictional forces couple the two plates and connect the bodies so that they rotate in unison. During the coupling, energy is dissipated in the form of heat due to the friction between the two plates. Solenoids are included in the transmission 106. A solenoid includes a helically-wound coil which creates a magnetic field upon excitation of the coil. Such magnetic fields are harnessed and used to apply a linear hydraulic force to one or both plates in a clutch. The torque transmitted across the clutch during engagement is denoted by $T_{clutch}$. The slip across the clutch is denoted as $|\omega_1 - \omega_2|$, where $\omega_1 - \omega_2$ is the difference between the rates of rotation of the two clutch plates. The power dissipated during engagement of a clutch (i.e. transmission clutch power loss, or clutch losses) is then described according to equation (3):

$$P_{clutch} = \sum_1^K T_{clutch_{m_{1-K}}} |\omega_1 - \omega_2|_{m_{1-K}} \quad (3)$$

for K clutches (i.e. m=1–K). Through testing, the torque transmitted across various clutches in transmission 106 has been determined as a function of the current applied to the coil(s). Therefore, the power loss in each clutch is known as a function of the current applied to the coil and the angular rotation rates of the two plates. Clutch losses occur when changing gears, as clutches either engage or disengage. When gears are not changing during operations, the clutch losses are zero and need not be calculated.

When all the power losses are known, the power needed from the power sources to maintain or achieve the target power profile are calculated according to equation (4):

$$P_{dt} = P_{engine} + P_{hybrid} - P_{loss} - P_K - P_{clutch} \quad (4)$$

or, alternatively as equation (5):

$$P_{dt} = P_{engine} + P_{hybrid} - P_{loss} - \\ \sum_1^N J_{i_{1-N}} \omega_{i_{1-N}} \dot{\omega}_{i_{1-N}} - \sum_1^K T_{clutch_{m_{1-K}}} |\omega_1 - \omega_2|_{m_{1-K}}, \quad (5)$$

where $P_{dl}$ is the target power profile, $P_{engine}$ is the engine 102 power, and $P_{hybrid}$ is the hybrid module 104 power.

Figure 3:
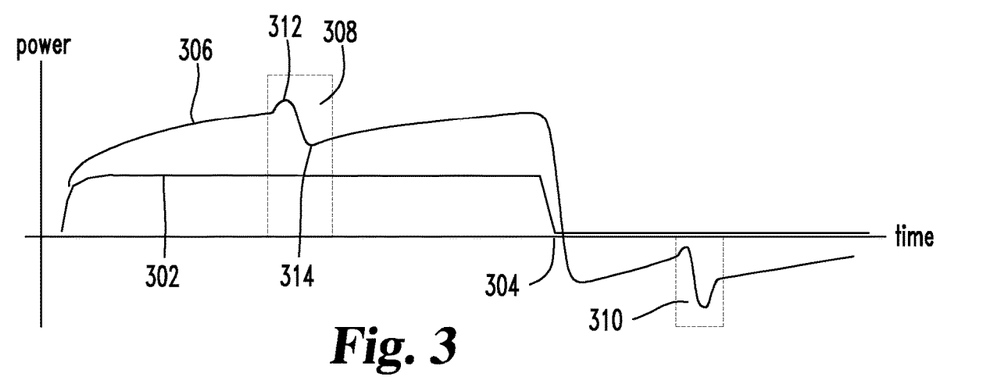
FIG. 3 illustrates a power output profile of a hybrid system without energy balancing.
Figure 4:
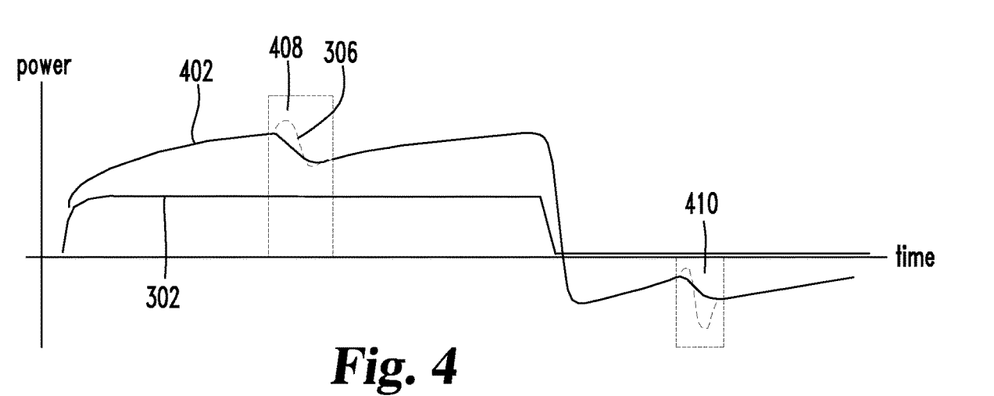
FIG. 4 illustrates a power output profile of a hybrid system with energy balancing.
Figure 5:
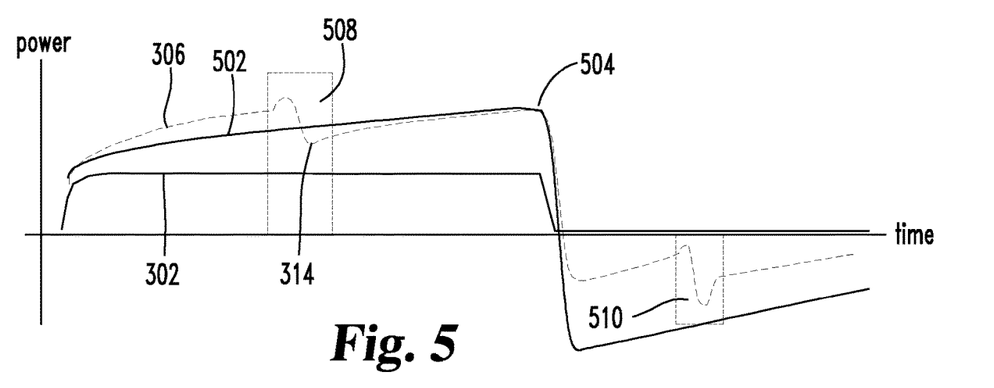
FIG. 5 illustrates a power output profile of a hybrid system with increased energy balancing.

FIGS. 3, 4, and 5 illustrate example implementations of different power profiles. FIG. 3 illustrates an example power profile according to current methods in which no target power profile is applied. The horizontal axis represents time and the vertical axis represents power. A user command profile 302 represents the users application of the accelerator. The profile of the user command profile 302 shows an initial steep slope beginning at zero which tapers off into a line having zero slope. The user command profile 302 can be characterized as a command for smooth acceleration until a desired vehicle speed is achieved. At 304, the desired speed is achieved and the user releases the accelerator and correspondingly the user command profile 302 returns to zero, indicating a desire to maintain or reduce the speed of the vehicle. Although the user command profile 302 indicates a desire for smooth acceleration, the vehicle does not deliver the desired power profile. Rather, the exemplary power profile 306 is achieved. The regions 308 and 310 indicate areas where gear changes occur. The region 308 indicates an upshift, and the region 310 indicates a downshift. In each of the regions 308 and 310, the power profile exhibits a disturbance. Generally, gear changes in automatic transmissions cause variances in torque applied to the wheels of the vehicle. This is due in part to a continuous supply of power from the power source even while the gear is disengaged. As a clutch disengages, the continuous supply of power causes an upsurge 312 in the power profile. Subsequently the re-engagement of the gears in the higher gear causes a downsurge 314 in the power profile. The continuous supply of power from the power source then causes the power profile to continue an upward trend in the new gear. A similar result happens during a downshift as shown in the region 310. The upsurge and downsurge in the regions 308 and 310 create disturbances in the drive train 108 which manifest as vibrations or other unwanted characteristics to the driver.

The details disclosed herein provide a method to precisely control the power profile of the vehicle and to create a driving experience that is more comfortable and/or custom tailored to the user's wishes. FIG. 4 illustrates a further example of a power profile. The user command profile 302 again illustrates a command for smooth acceleration to a desired vehicle speed. A target power profile 402 diverges from the exemplary power profile 306 in the regions 408 and 410. The target power profile is chosen to minimize the disturbance in the drive train 108 during gear shifts by reducing the magnitude of the profile disturbances in regions 408 and 410.

FIG. 5 illustrates a further example showing a target power profile 502. The figure again illustrates the user command profile 302 which calls for a smooth acceleration to a desired vehicle speed at 504. The exemplary power profile 306 is shown again for comparison. The target power profile 502 continues without significant disturbance throughout the gear shifts in the regions 508 and 510. Such a power profile creates a significantly smoother acceleration experience than that provided by the exemplary power profile 306.

Realization of the target power profile 502 is achieved according to the methods described herein, including obtaining the loss parameters, calculating the power losses in the drive train 108, and determining the level of torque that is needed at the transmission input shaft in order to maintain the target power profile 502 at the wheels 110 of the vehicle. Values for each of the loss parameters described herein are sampled regularly for each operating state (i.e. gear position, speed of motors, speed of wheels, etc) and received by the transmission/hybrid control module 148. When the engine 102 and/or the hybrid module 104 are already rotating and/or supplying torque to the drive train 108, that speed or torque information is conveyed to the transmission/hybrid control module 148 along with the speed of wheels 110. In some cases the values of the loss parameters are sampled at specific intervals (e.g. 50-100 samples per second). Each sampling produces a result set of values.

Figure 6:
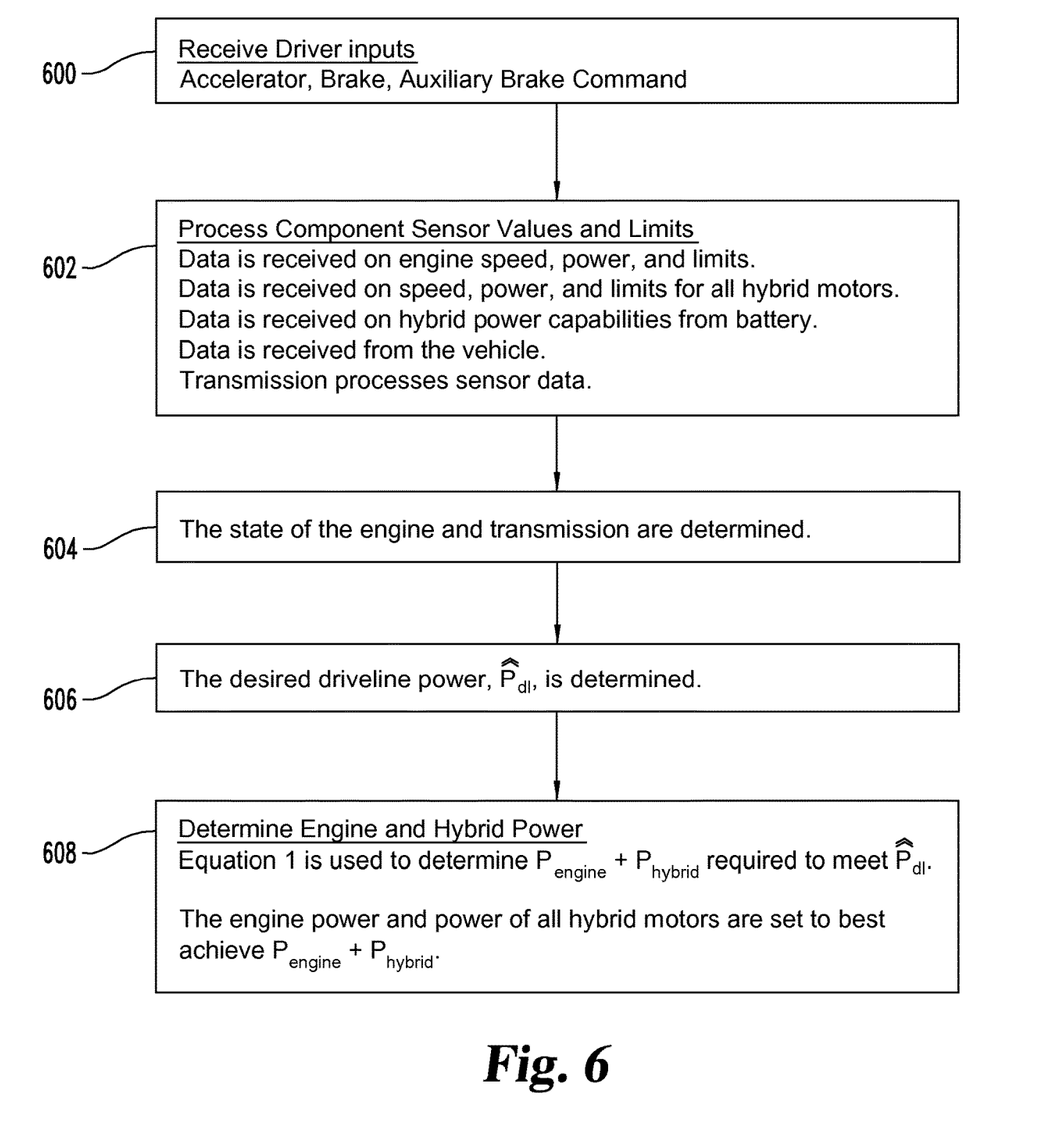
FIG. 6 illustrates a flow chart showing of actions of a method to balance energy within a hybrid vehicle.

An algorithm describing the method disclosed herein will now be described according to FIG. 6. In a typical operation, the vehicle may be at any number of operational states (stopped, constant velocity, accelerating, decelerating, etc.). The driver executes a driver input (or command input) which could be actuation of the accelerator, brake, or auxiliary brake command. The transmission/hybrid control module 148 receives the driver input at action 600.

Current vehicle operational data is transferred to the transmission/hybrid control module 148 at action 602. This includes information related to the current operation of the engine 102, the hybrid module 104, energy storage system 134, and the vehicle. The engine 102 speed, power (or torque produced), and limits associated with speed and power are obtained from the engine control module 146 over the vehicle data link. Data is also obtained regarding the speed, power (or torque produced), for all hybrid motors (i.e. hybrid module 104). Information related to the hybrid power capabilities is obtained from the energy storage system 134 over the hybrid data link. Data related to the vehicle such as wheel 110 speed and/or acceleration is also obtained. The transmission/hybrid control module 148 stores these values. In some embodiments, the transmission/hybrid control module 148 measures operational data directly. In other embodiments, any data described herein is measured and/or obtained by any of a variety of sensors and controllers, with the data ultimately being obtained by a single controller for processing.

At action 604, the transmission/hybrid control module 148 obtains the loss parameters necessary to calculate the losses according to equations (1), (2), and (3). The loss parameters (as already described above) include the gear configuration of the transmission 106, the current configuration of gears in the transmission including rotational speeds ($\omega$), acceleration ($\dot{\omega}$), and rotational inertia (J) of each. If a gear change is in progress, then loss parameters for each clutch undergoing change are obtained, such as angular rotation speeds ($\omega_1$ and $\omega_2$) of each clutch plate and the value of the torque across the clutch ($T_{clutch}$). The temperature of the hydraulic fluid in the transmission 106 as well as the pressure and flow rate of the hydraulic fluid are obtained. The three values of the pressure losses are then calculated (equations (1), (2), and (3)) and stored by the transmission/hybrid control module 148.

At action 606, the transmission/hybrid control module 148 calculates a target power profile ($P_{dl}$) based on the driver input received in action 600. The target power profile ($P_{dl}$) is determined based on a user's specific preference and can be tailored in a variety of ways. For example, the target power profile can be chosen to optimize fuel economy, maximize acceleration, cancel power fluctuations from transmission shifts, or smooth the drive line power profile for driver comfort. For example, the smooth slope of the target power profile 502 of FIG. 5 is optimized to cancel power fluctuations from transmission shifts and/or to increase fuel efficiency. A target power profile optimized for increased acceleration would have a steeper initial slope that tapered off earlier than the point 504. Some of these objectives may exclude others. For example, a profile chosen to optimize fuel economy is generally incompatible with a profile chosen to maximize acceleration. The strategy behind the profile selection may change at various times during the service life of the vehicle. In some cases, the profile can be user-selectable. For example, in some embodiments, an interface is placed within the cab or elsewhere on the vehicle so that the user can choose a target power profile based on an immediate or changed need during operation. In other embodiments, the target power profile is not selectable by the user (e.g. in situations where an owner prefers to maximize fuel economy in contrast to the driver who prefers to maximize driver comfort or acceleration).

At action 608, the transmission/hybrid control module 148 calculates the power requirement from the engine 102 and the hybrid module 104 ($P_{engine}+P_{hybrid}$) that is needed to meet the target power profile according to equation (4), which includes consideration of the difference between the actual power profile and the target power profile. In other words, equation (4) is solved for $P_{engine}+P_{hybrid}$. The transmission/hybrid control module 148 sends torque commands to the engine control module 146 and the hybrid module 104, and the engine 102 and hybrid module 104 are set to best achieve $P_{engine}+P_{hybrid}$. The torque commands are executed, and the target power profile is achieved.

Operation of the engine 102 and hybrid module 104 are tailored to make the actual power profile match the target power profile, as described below. Because the sampling and calculations are performed many times per second, any commands sent to the power sources which are needed to maintain the target power profile are immediately conveyed. Similarly, because the sampling occurs frequently, any changes to the state of the vehicle or driver inputs (e.g. change from acceleration to brake or change in incline of a road) are immediately considered. In this way, the target power profile can change and still be maintained by the vehicle.

Generally, a determination is made as to the appropriate split in power between the two power sources in order to make the actual power profile match the target power profile with the user's goal in mind, as each power source has different efficiencies and/or operating limits at any given operating condition. For example, the state of charge of the energy storage system 134 informs the transmission/hybrid control module 148 as to how much of the power can be provided by hybrid module 104 at any given moment and at what efficiency.

As mentioned previously, the drive train 108 couples the power sources (i.e. the engine 102 and the hybrid module 104) to the wheels 110. Torque can be transferred to an input shaft of transmission 106 independently by either the engine 102 or the hybrid module 104. Alternatively, the engine 102 and the hybrid module 104 can work in conjunction to transfer torque to the transmission 106. The hybrid module clutch allows the hybrid module 104 to couple or decouple with the engine 102 so that the hybrid module 104 can be turned by the engine 102, independently supply torque to the input shaft of the transmission 106, or work in conjunction with the engine 102 to supply torque to the input shaft of the transmission 106. Each power source has particular efficiency advantages and missions for a variety of different operating conditions. An algorithm executed by the transmission/hybrid control module is used to maintain a balance of the power sources that most efficiently realizes both the target power profile and other operating considerations.

While the disclosure has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosures defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method, comprising:
using a controller to select a power profile for a drivetrain of a vehicle that includes an engine and an electric motor selectively coupled to a transmission, the power profile defining predetermined power levels to be delivered by the drivetrain over time;
determining an output power of the engine and transmission using the controller; wherein the controller determines the output power of the engine and the transmission using one or more loss parameters; and
controlling the engine and the electric motor to provide an input power level to the transmission that results in an output power of the drivetrain that matches the power profile;
wherein the loss parameters include power losses caused by rotational inertia of at least one body within the drivetrain.

2. The method of claim 1, comprising:
reducing power output from the engine and the electric motor using the controller when the controller determines the transmission is shifting gear ratios.

3. The method of claim 1, comprising:
reducing power output from the engine and the electric motor using the controller when the controller determines the transmission is decoupled from the drivetrain.

4. The method of claim 1, comprising:
accepting a command input from a user using the controller, wherein the controller uses the command input to select the power profile.

5. The method of claim 4, wherein the user command input includes actuation of an accelerator or a brake.

6. The method of claim 1, further comprising:
calculating an overall power loss for the engine, electric motor, and transmission using the controller, the controller calculating the power loss using the one or more loss parameters.

7. The method of claim 1, wherein controlling the engine and the electric motor to provide an input power to the transmission includes decoupling the engine from the transmission using a clutch and providing the input power level from the electric motor.

8. The method of claim 1, wherein controlling the engine and the electric motor to provide an input power to the transmission includes decoupling the electric motor from the transmission using a clutch and providing the input power level from the engine.

9. The method of claim 1, wherein controlling the engine and the electric motor to provide an input power to the transmission includes controlling the engine to provide a predetermined portion of the input power to the transmission, and controlling the electric motor to provide the remaining portion of the input power to the transmission.

10. The method of claim 1, wherein the power losses include losses caused by a rotational speed or acceleration of the at least one body in the drivetrain.

11. The method of claim 1, wherein the drivetrain has at least one clutch, wherein the power losses include a clutch power loss for the at least one clutch.

12. The method of claim 1, wherein the power losses include a pressure, temperature, or flow rate of a hydraulic fluid in the drivetrain.

13. A method, comprising:
   determining a power profile for a drivetrain of a vehicle using a controller, the vehicle having an engine and an electric motor selectively coupled to a transmission, the power profile defining multiple predetermined power levels to be delivered by the drivetrain over time;
   determining an output power of the engine and transmission using the controller; wherein the controller determines the output power of the engine and the transmission using one or more loss parameters; and
   controlling the engine and the electric motor to provide an input power level to the transmission that results in an output power of the drivetrain that matches the power profile;
   wherein the loss parameters include power losses caused by rotational inertia of at least one body within the drivetrain.

14. The method of claim 13, comprising:
   accepting a user command input using the controller, wherein the command input includes a user preference selected by the from an interface configured to present one or more user preferences, wherein controller uses the command input to determine the power profile.

15. The method of claim 13, wherein the loss parameters include power losses a power dissipated during engagement of a plurality of clutch plates in a clutch that is part of the drivetrain.

16. The method of claim 13, wherein the power losses include losses caused by a rotational speed or acceleration of the at least one body in the drivetrain.

17. The method of claim 13, wherein the power losses include a pressure, temperature, or flow rate of a hydraulic fluid in the drivetrain.

18. The method of claim 17, wherein the user preference includes a fuel economy preference.

19. The method of claim 17, wherein the user preference includes an emissions minimization preference.

20. The method of claim 17, wherein the user preference includes an output power maximization preference.

21. The method of claim 17, wherein the user preference includes a driver comfort preference.

22. The method of claim 17, comprising:
   accepting a second user command input using the controller;
   wherein the second user command input includes actuation of an accelerator or a brake; and
   wherein the controller uses the second user command input to modify the power profile.

* * * * *